(12) United States Patent
Tu

(10) Patent No.: US 7,920,883 B2
(45) Date of Patent: *Apr. 5, 2011

(54) COORDINATION OF TRANSMISSIONS IN WIRELESS COMMUNICATIONS DEVICES

(75) Inventor: Jerome C. Tu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/617,277

(22) Filed: Dec. 28, 2006

(65) Prior Publication Data

US 2008/0161031 A1 Jul. 3, 2008

(51) Int. Cl.
*H04Q 7/20* (2006.01)

(52) U.S. Cl. .......... 455/512; 455/553.1; 455/456.2; 455/115.1; 370/278

(58) Field of Classification Search ............ 455/553.1, 455/512, 41.2, 73, 39, 78, 63.1, 63, 436, 455/456.2, 403, 502, 68; 370/331, 252, 348, 370/445, 466, 338, 278, 344, 347, 478, 395.21, 370/217
See application file for complete search history.

(56) References Cited

U.S. PATENT DOCUMENTS

| | | | | |
|---|---|---|---|---|
| 6,778,491 B1 * | 8/2004 | Fourcand et al. | ............ | 370/217 |
| 7,164,671 B2 * | 1/2007 | del Prado et al. | ............ | 370/338 |
| 7,215,659 B1 * | 5/2007 | Chen et al. | ............ | 370/338 |
| 7,233,602 B2 * | 6/2007 | Chen et al. | ............ | 370/445 |
| 2001/0010689 A1 * | 8/2001 | Awater et al. | ............ | 370/344 |
| 2002/0136233 A1 * | 9/2002 | Chen et al. | ............ | 370/445 |
| 2003/0123405 A1 * | 7/2003 | del Prado et al. | ............ | 370/331 |
| 2004/0224708 A1 * | 11/2004 | Brabenac | ............ | 455/502 |
| 2004/0253963 A1 * | 12/2004 | Park et al. | ............ | 455/456.2 |
| 2005/0068965 A1 * | 3/2005 | Lin et al. | ............ | 370/395.21 |
| 2005/0094642 A1 * | 5/2005 | Rogers | ............ | 370/395.4 |
| 2005/0170776 A1 | 8/2005 | Siorpaes et al. | | |
| 2006/0053146 A1 * | 3/2006 | Allhusen et al. | ............ | 707/102 |
| 2007/0071026 A1 * | 3/2007 | Rogers | ............ | 370/458 |
| 2007/0149137 A1 * | 6/2007 | Richardson et al. | ............ | 455/68 |
| 2007/0238483 A1 * | 10/2007 | Boireau et al. | ............ | 455/553.1 |
| 2008/0102885 A1 * | 5/2008 | Tu et al. | ............ | 455/553.1 |

OTHER PUBLICATIONS 802.15.2 (TM), "Part 15.2: Coexistence of Wireless Personal Area Networks with Other Wireless Devices Operating in Unlicensed Frequency Bands", IEEE Computer Society, New York, NY, Aug. 28, 2003.
U.S. Appl. No. 11/555,255, filed Oct. 31, 2006, Jerome C. Tu, et al.

* cited by examiner

*Primary Examiner* — Tan Trinh
(74) *Attorney, Agent, or Firm* — Kacvinsky Daisak, PLLC

(57) ABSTRACT

Techniques involving network access are disclosed. For instance, an apparatus may include first and second transceivers, a first control module, and a second control module. Each transceiver may send one or more wireless transmissions, which are scheduled by the control modules. For example, the first control module may schedule transmissions of the first transceiver and the second control module may schedule transmissions of the second transceiver. These may be scheduled to avoid transmissions of the first transceiver overlapping in time with transmissions of the second transceiver.

20 Claims, 10 Drawing Sheets

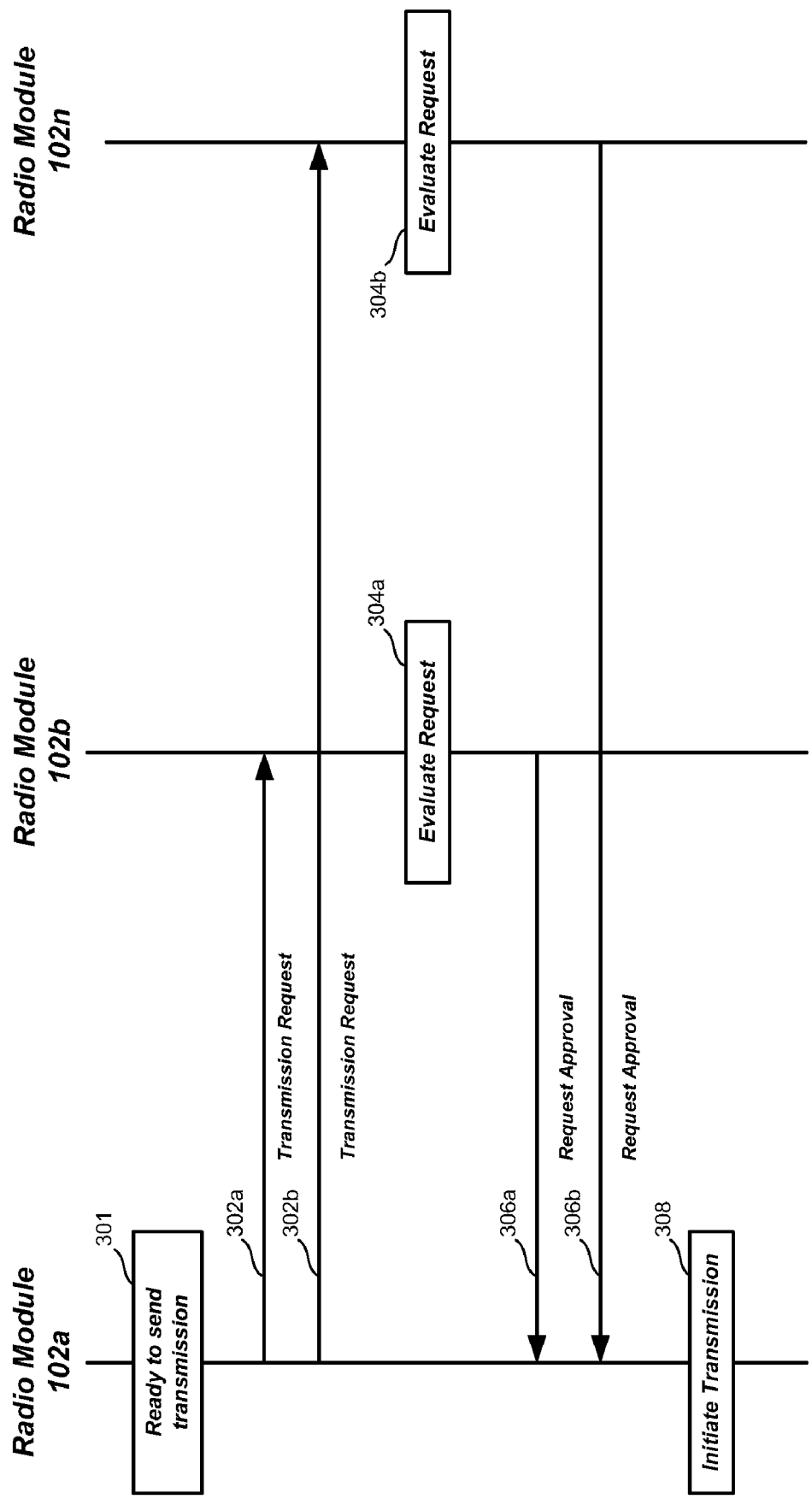

US 7,920,883 B2

COORDINATION OF TRANSMISSIONS IN WIRELESS COMMUNICATIONS DEVICES

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

The transmission of wireless signals can consume significant amounts of energy. Many mobile devices receive operational power from rechargeable batteries having limited energy storage capacity as well as power delivery constraints. Thus, techniques that effectively manage energy consumption in such devices may be desirable.

BRIEF DESCRIPTION OF THE DRAWINGS

FIGS. 3A and 3B are diagrams illustrating the coordination of transmissions among radio modules.

DETAILED DESCRIPTION

Various embodiments may be generally directed to techniques for coordinating transmissions in communications devices. For instance, an apparatus may include first and second transceivers, a first control module, and a second control module. Each transceiver may send one or more wireless transmissions, which are scheduled by the control modules. For instance, the first control module may schedule transmissions of the first transceiver and the second control module may schedule transmissions of the second transceiver. These may be scheduled to avoid the transmissions of the first transceiver overlapping in time with the transmissions of the second transceiver.

Moreover, an apparatus may include first and second transceivers, and a coordination module. Each of the transceivers may send one or more wireless transmissions. These transmissions are scheduled by the coordination module to avoid the wireless transmissions of the first transceiver overlapping with the wireless transmissions of the second transceiver.

Various advantages may be obtained through the avoidance of overlapping transmissions. For example, the occurrence of excessive power drains on an apparatus's power supply may be reduced. In addition, the degradation of wireless transmissions by spurious emissions may be reduced. Moreover, intended recipients of such transmissions may experience less interference.

Embodiments of the present invention may involve a variety of wireless communications technologies. These technologies may include cellular and data networking systems. Exemplary data networking systems include wireless local area networks (WLANs), wireless metropolitan area networks (WMANs), and personal area networks (PANs).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
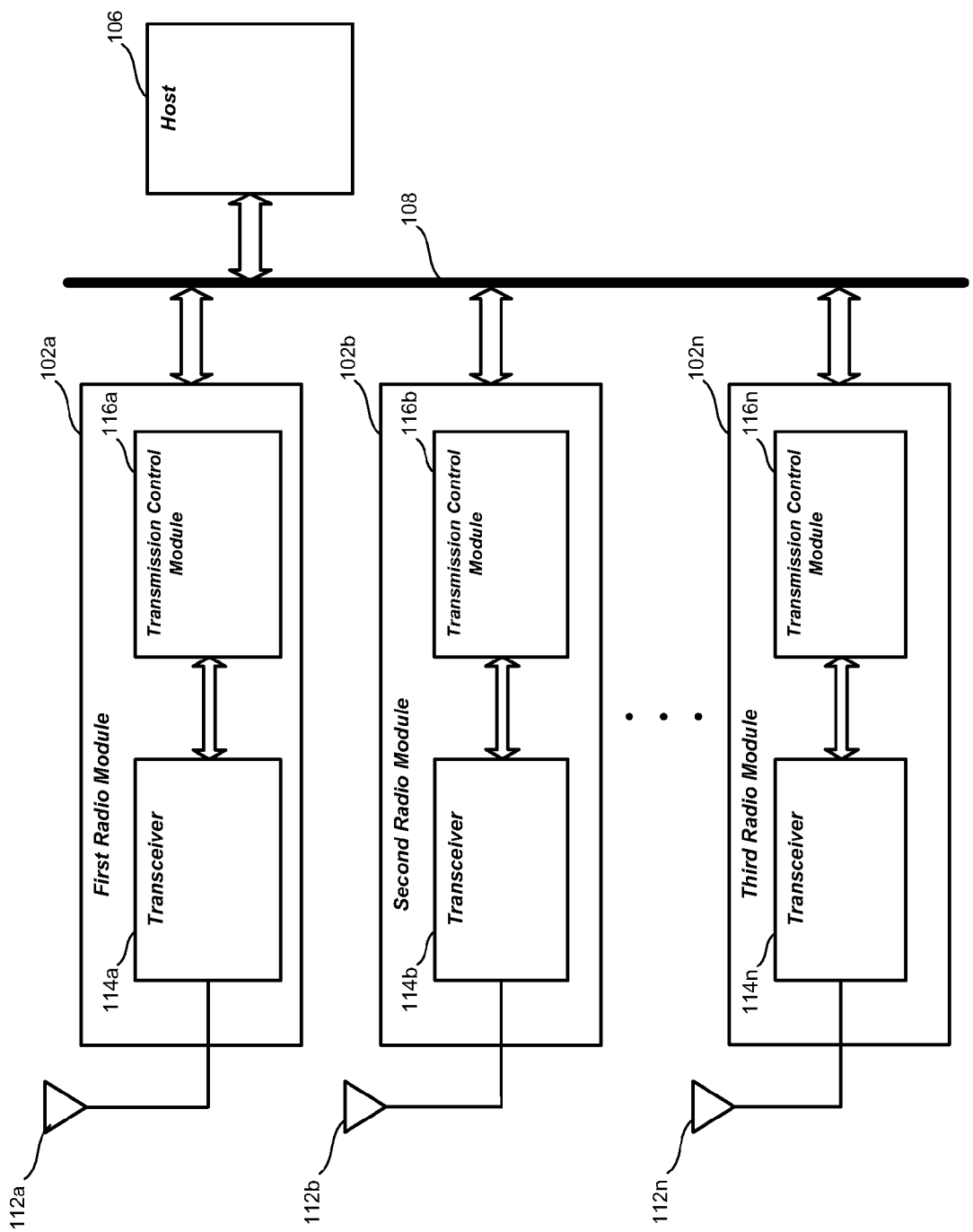
FIG. 1 illustrates an embodiment of an apparatus.

FIG. 1 illustrates one embodiment of an apparatus that may communicate across wireless links. In particular, FIG. 1 shows an apparatus 100 comprising various elements. The embodiments, however, are not limited to these depicted elements. FIG. 1 shows that apparatus 100 may include multiple radio modules 102a-n, a host 106, and an interconnection medium 108. These elements may be implemented in hardware, software, firmware, or in any combination thereof. Moreover, these elements may receive operational power from a power supply, such as a rechargeable battery (not shown).

Each radio module 102 may communicate, through a corresponding antenna 112, with remote devices across various types of wireless links. For example, radio modules 102 may communicate across data networking links. Examples of such data networking links include wireless local area network (WLAN) links, such as IEEE 802.11 WiFi links. Further examples include wireless metropolitan area (WMAN) links, such as IEEE 802.16 WiMax links and WiBro links. Yet further examples include WiMedia/Ultra Wide Band (UWB) links (such as ones in accordance with Ecma International standards ECMA-368 and ECMA-369). Also, exemplary data networking links include personal area networks (PAN) links such as Bluetooth links, and WiBree (initially developed by Nokia Research Centre) links. The embodiments, however, are not limited to these examples.

Alternatively or additionally, radio modules 102 may communicate across wireless links provided by one or more cellular systems. Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA) systems, Narrowband Advanced Mobile Phone Service (NAMPS) systems, third generation (3G) systems such as Wide-band CDMA (WCDMA), CDMA-2000, Universal Mobile Telephone System (UMTS), cellular radiotelephone systems compliant with the Third-Generation Partnership Project (3GPP), and so forth. However, the embodiments are not limited to these examples. For example, various 4G systems may be employed.

FIG. 1 shows that each radio module 102 includes a transceiver 114 and a transmission control module 116. More particularly, FIG. 1 shows radio module 102a having a transceiver 114a and a transmission control module 116a, radio module 102a having a transceiver 114a and a transmission control module 116a, and radio module 102n having a transceiver 114n and a transmission control module 116n.

Each transceiver 114 may include a transmitter to send wireless transmissions. In addition, each transceiver 114 may include a receiver to receive wireless transmissions. These transmissions comprise signals that are generated according to various modulation schemes and are transmitted at various frequencies. To provide such features, each transceiver 114 may include electronics, such as modulators, demodulators, amplifiers, filters, and so forth.

FIG. 1 shows that each transmission control module 116 is coupled to a corresponding transceiver 114. For instance, transmission control module 116a is coupled to a transceiver 114a, transmission control module 116b is coupled to a transceiver 114b, and transmission control module 116n is coupled to a transceiver 114n.

Each transmission control module 116 may direct when its coupled transceiver 114 sends wireless transmissions. This may involve a transmission control module 116 sending a transmission directive to its coupled transceiver 114. In addition, each transceiver 114 may indicate to its coupled transmission control module 116 when it is ready to send a transmission. Such directives and indications may be in the form of signals, data messages, and so forth.

Transmission control modules 116 perform scheduling of wireless transmissions for their corresponding transceivers 114. This scheduling may be performed to avoid transmissions from different radio modules 102 overlapping in time. Such scheduling may involve the exchange of information between radio modules 102. For instance, transmission control modules 116 of different radio modules 102 may exchange various messages or signals with each other. These messages or signals may pertain to the operation of transceivers 114.

Such messages or signals may in the form of requests and responses. For example, when a transceiver 114 of a particular radio module 102 is ready to send a wireless transmission, a request for transmission may be sent to the other radio module(s) 102.

Upon receipt, the other radio module(s) 102 may evaluate such requests and generate a response. For example, a responding radio module 102 may generate an approval response granting permission for the requesting radio module 102 to transmit. Alternatively, a responding radio module 102 may generate a denial response, which disapproves of the requesting radio module 102 sending its wireless transmission.

This evaluation of requests and generation of responses may be performed by the transmission control module 116 at each responding radio module 102.

These messages may be implemented as signals allocated to one or more signal lines. However, further embodiments may alternatively employ data messages. Such data messages may be sent across various connections. Exemplary connections include parallel interfaces, serial interfaces, and bus interfaces.

In evaluating a transmission request, a responding radio module 102 may generate an approval response upon the occurrence of one or more approval conditions. One such condition may be that the responding radio module 102 is unprepared to send any wireless transmissions.

A request may convey various forms of information, such as a priority assigned to the requested transmissions and/or a quality of service associated with the requested transmission. Also, a request may include information regarding the requested transmission's duration and/or its transmission type (e.g., ACKNOWLEDGEMENT, TCP data, MAC data, etc.).

When such information is conveyed, further approval conditions may be employed. For example, a responding radio module 102 (or its transmission control module 116) may approve a request when the responding radio module 102 is prepared to send a wireless transmission having a lower priority than the priority indicated by the request. Alternatively, approval may be granted when the responding radio module 102 is prepared to send a wireless transmission having a priority that is equal to or less than the priority indicated by the request. Also, approval may be granted based on quality of service (QOS) information provided with the request. For example, approval may be granted when a request indicates a QOS that is above a predetermined threshold.

A responding radio module 102 (or its transmission control module 116) may deny a request when no approval conditions exist. For instance, a responding radio module 102 may respond to a request with a denial when it is prepared to send a wireless transmission having a greater priority than the priority indicated by the request. Alternatively, a denial may occur when the responding radio module 102 is prepared to send a wireless transmission having a priority that is greater to or equal than the priority indicated by the request.

Upon the receipt of responses from other radio modules 102, a requesting transmission control module 116 makes a transmission decision. For instance, if all of the received response(s) indicate approval, then the transmission control module 116 directs its coupled transceiver 114 to send its transmission. However, if one or more of the received response(s) indicates denial, then the transmission control module 116 does not direct its coupled transceiver 114 to send its transmission.

When the transmission control module 116 refrains from directing its coupled transceiver 114 from sending its transmission, it may send a further transmission request to the one or more other radio modules 102. Such a further request may be sent at a subsequent time. This subsequent time may be determined according to various techniques. For example, a predetermined delay value may be used. Alternatively, a randomly generated delay time (or backoff delay) may be used. Such random generation may occur each time a transmission control module 116 decides to send a subsequent transmission request.

FIG. 1 shows that apparatus 100 may further include a host 106, which may exchange information with radio modules 102a-n. As shown in FIG. 1, such exchanges may occur across interconnection medium 108. For instance, host 106 may send information to these radio modules for wireless transmission. Conversely, radio modules 102a-n may send information to host 106 that was received in wireless transmissions. In addition, host 106 may exchange information with radio modules 102a-n regarding their configuration and operation. Examples of such information include control directives issued by host 106.

Furthermore, host 106 may perform operations associated with one or more protocols (e.g., multiple protocols at various layers). Additionally, host 106 may perform operations associated with user applications. Exemplary user applications include telephony, text messaging, e-mail, web browsing, word processing, and so forth. Moreover, host 106 may provide one or more functional utilities that are available to various protocols, operations, and/or applications. Exemplary utilities include operating systems, device drivers, user interface functionality, and so forth.

Interconnection medium 108 provides for couplings among elements, such as radio module 102 and host 106. Thus, interconnection medium 108 may include, for example, one or more bus interfaces. Exemplary interfaces include Universal Serial Bus (USB) interfaces, as well as various computer system bus interfaces. Additionally or alternatively, interconnection medium 108 may include one or more point-to-point connections (e.g., parallel interfaces, serial interfaces, etc.) between various element pairings. Such connection may comprise one or more signal lines. In embodiments, interconnection medium 108 may provide for the exchange of information between radio modules 102 (e.g., between transmission control modules 116), as described herein.

In general operation, apparatus 100 may engage in wireless communications with various types of networks. In addition, apparatus 100 may coordinate access information among radio modules 102 based on an assessment of its locality.

As described above, FIG. 1 provides an exemplary apparatus arrangement. However, the embodiments are not limited to this arrangement. For instance, FIG. 1 shows host 106 being coupled to one or more radio modules via interconnection medium 108. However, the embodiments are not limited as such. For example, embodiments may not include a separate host. Also, embodiments may provide an integrated host/radio architecture. In such embodiments, features of a host and one or more radio modules may be implemented together in a single entity, such as a processor or package. Accordingly, a single processor (or processing entity) may provide host and radio module(s). Thus, interconnection medium 108 may include non-physical aspects. More particularly, such interconnectivity may be implemented through messages passed between processes or software modules.

Figure 2:
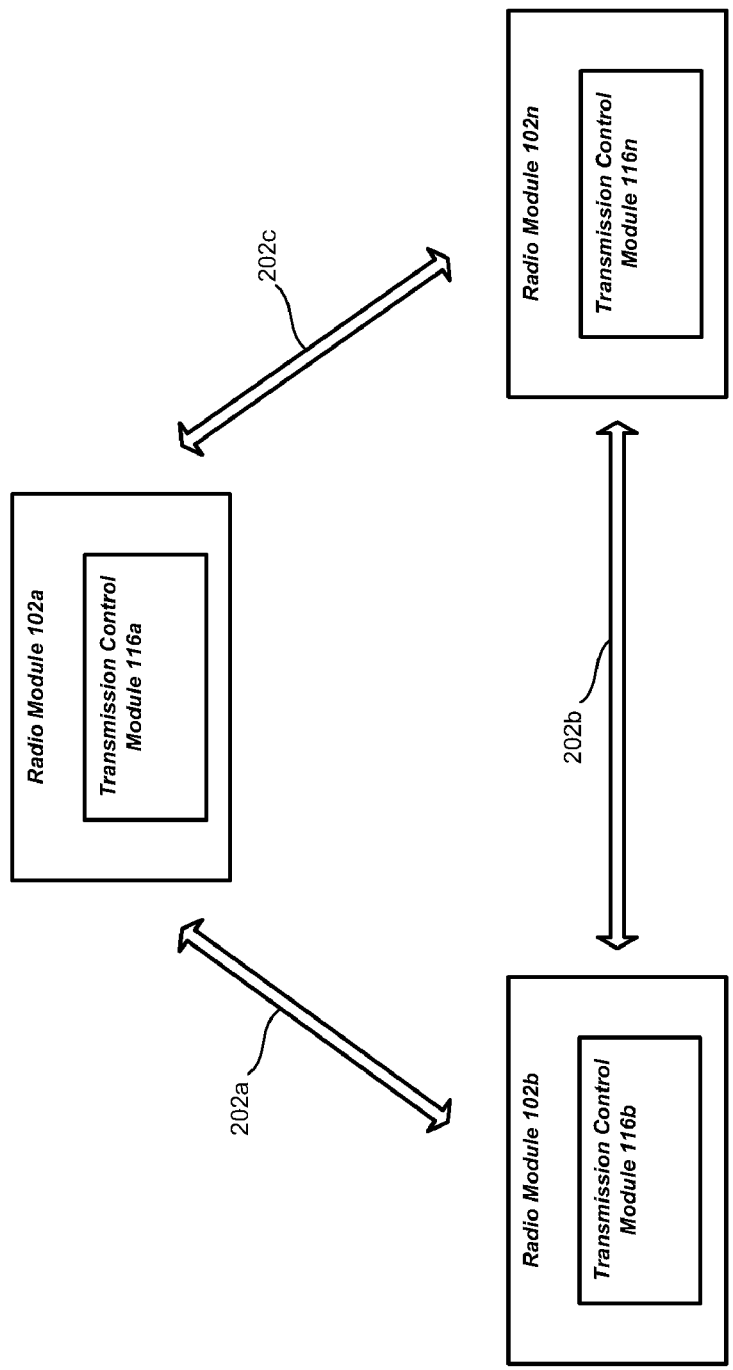
FIG. 2 illustrates an exemplary exchange of information among radio modules.

FIG. 2 is a diagram 200 illustrating an exemplary manner in which information regarding the operation of radio modules may be exchanged. This manner of exchange is described with reference to apparatus 100 of FIG. 1. However, this manner of exchange may also be employed by other embodiments.

As shown in FIG. 2, information exchanges 202 may occur between radio modules 102. More particularly, FIG. 2 shows an exchange 202a that occurs between radio modules 102a and 102b, an exchange 202b that occurs between radio modules 102b and 102n, and an exchange 202c that occurs between radio modules 102a and 102n. As described above, such exchanges may be handled by transmission control modules 116.

These exchanges may include various forms of information. Examples of such information may include transmission requests, responses to such requests, and indications of occurring transmissions. Examples involving such information are described, for example, with reference to FIGS. 3A and 3B.

Figure 3B:
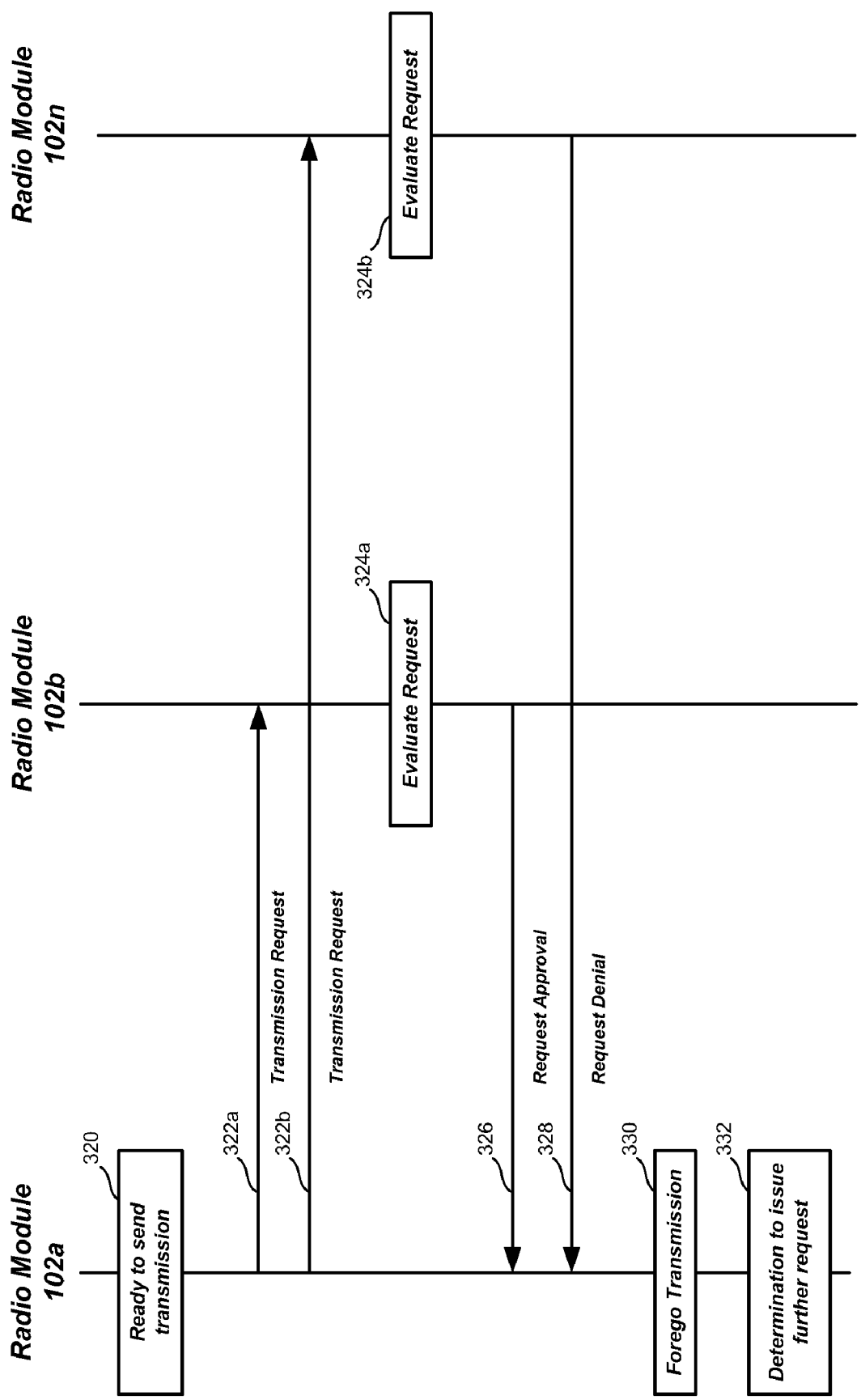

FIGS. 3A and 3B are diagrams illustrating examples involving the scheduling and coordination of transmissions. In particular, FIG. 3A provides an example in which a radio module receives authorization to initiate a wireless transmission, while FIG. 3B is an example in which a radio module fails to receive such authorization. These examples are described with reference to apparatus 100 of FIG. 1. The embodiments, however, are not limited to this context.

FIG. 3A shows a block 301, which indicates that radio module 102a is ready to send a transmission. Thus, radio module 102a sends a transmission request 302a to radio module 102b and a transmission request 302b to radio module 102n. Although, these are shown as separate requests, these may be implemented as a single request (e.g., a single signal or message) that is "broadcast" or addressed to both radio modules 102b and 102n. Upon receipt, radio modules 102b and 102n evaluate the request(s), as indicated by blocks 304a and 304b.

These evaluations result in radio module 102b sending an approval response 306a and radio module 102n sending an approval response 306b. Upon receiving these responses, a block 308 initiates sending the transmission of radio module 102a. As described above, this may involve transmission control module 116a directing transceiver 114a to send the transmission.

FIG. 3B is similar to FIG. 3A. For instance, FIG. 3B indicates, by block 320, that radio module 102a is ready to send a transmission. Also, FIG. 3B shows radio module 102a sending transmission requests 322a and 322b, which are evaluated by blocks 324a and 324b.

However, in FIG. 3B, only radio module 102b grants approval. More particularly, FIG. 3B shows that radio module 102b sends an approval response 326 to radio module 102a, while radio module 102n sends a denial response 328 to radio module 102a. As a result, a block 330 determines that radio module 102a should refrain from sending its transmission.

However, FIG. 3B shows a block 332, in which radio module 102a makes a determination to issues a further request to send its transmission. Thus, block 332 may establish when to send the further request. As described above, this may involve the use of a predetermined delay time or a randomly generated delay time.

Figure 4:
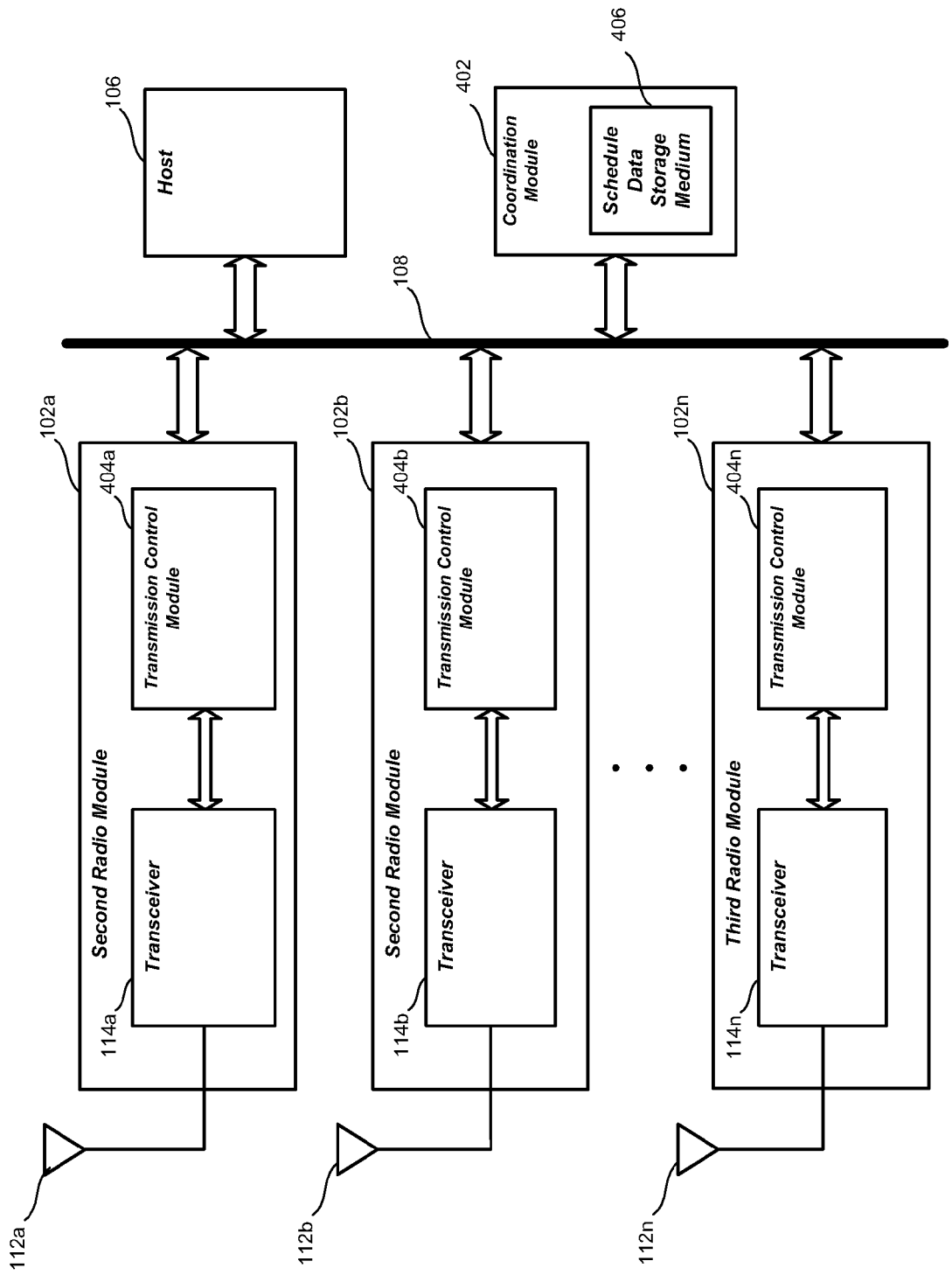
FIG. 4 illustrates an embodiment of an apparatus.

FIG. 4 illustrates a further apparatus embodiment. In particular, FIG. 4 shows an apparatus 400, which is similar to apparatus 100 of FIG. 1. However, apparatus 400 includes a coordination module 402. Also, in apparatus 400, transmission control modules 116 have been replaced with transmission control modules 404. For instance, FIG. 4 shows radio module 102a having a transmission control module 404a, radio module 102b having a transmission control module 404b, and radio module 102n having a transmission control module 404n. Coordination module 402 and transmission control modules 404 may be implemented in hardware, software, firmware, or any combination thereof.

Coordination module 402 schedules transmissions for each of radio modules 102 (e.g., for each of transceivers 114). This may be done to avoid such transmissions overlapping in time. Such scheduling may involve coordination module 402 exchanging information with radio modules 102. For example, coordination module 402 may exchange information with transmission control modules 402.

As shown in FIG. 4, coordination module 402 may include a schedule data storage medium 406 to store and maintain a "master schedule" of the transmissions it schedules. Thus, coordination module 402 may use storage medium 402 to find available transmission times for requested transmissions. Storage medium 406 may be implemented in memory or other suitable information storage media, as described herein.

FIG. 4 shows that each transmission control module 404 is coupled to a corresponding transceiver 114. For instance, transmission control module 404a is coupled to transceiver 114a, transmission control module 404b is coupled to transceiver 114b, and transmission control module 404n is coupled to transceiver 114n.

Each transmission control module 404 may direct when its coupled transceiver 114 sends transmissions. This may involve a transmission control module 404 sending a transmission directive to its coupled transceiver 114. In addition, each transceiver 114 may indicate to its coupled transmission control module 404 when it is ready to send a transmission. Such directives and indications may be in the form of signals, data messages, and so forth.

Figure 5:
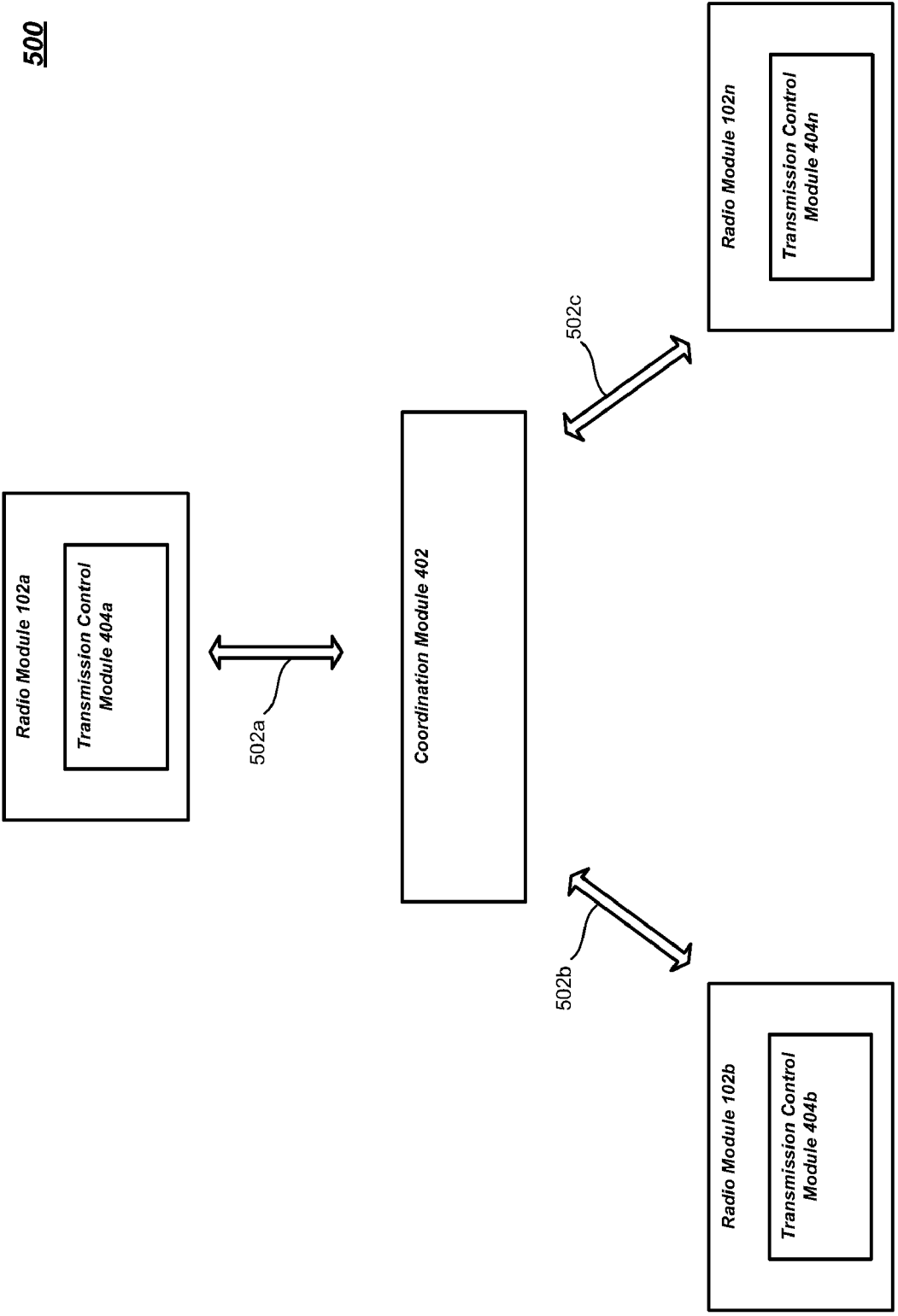
FIG. 5 illustrates an exemplary exchange of information between radio modules and a coordination module.

Moreover, radio modules 102 may exchange information with coordination module 402. FIG. 5 is a diagram 500 illustrating an exemplary manner in which such information exchange may occur. As shown in FIG. 5, information exchanges 502 may occur between radio modules 102 and coordination module 402 according to a "hub and spoke" topology. More particularly, FIG. 5 shows an exchange 502a that occurs between radio module 102a and coordination module 402, an exchange 502b that occurs between radio module 102b and coordination module 402, and an exchange 502c that occurs between radio module 102n and coordination module 402. For each radio module 102, such exchanges may be handled by its transmission control module 404.

Figure 6:
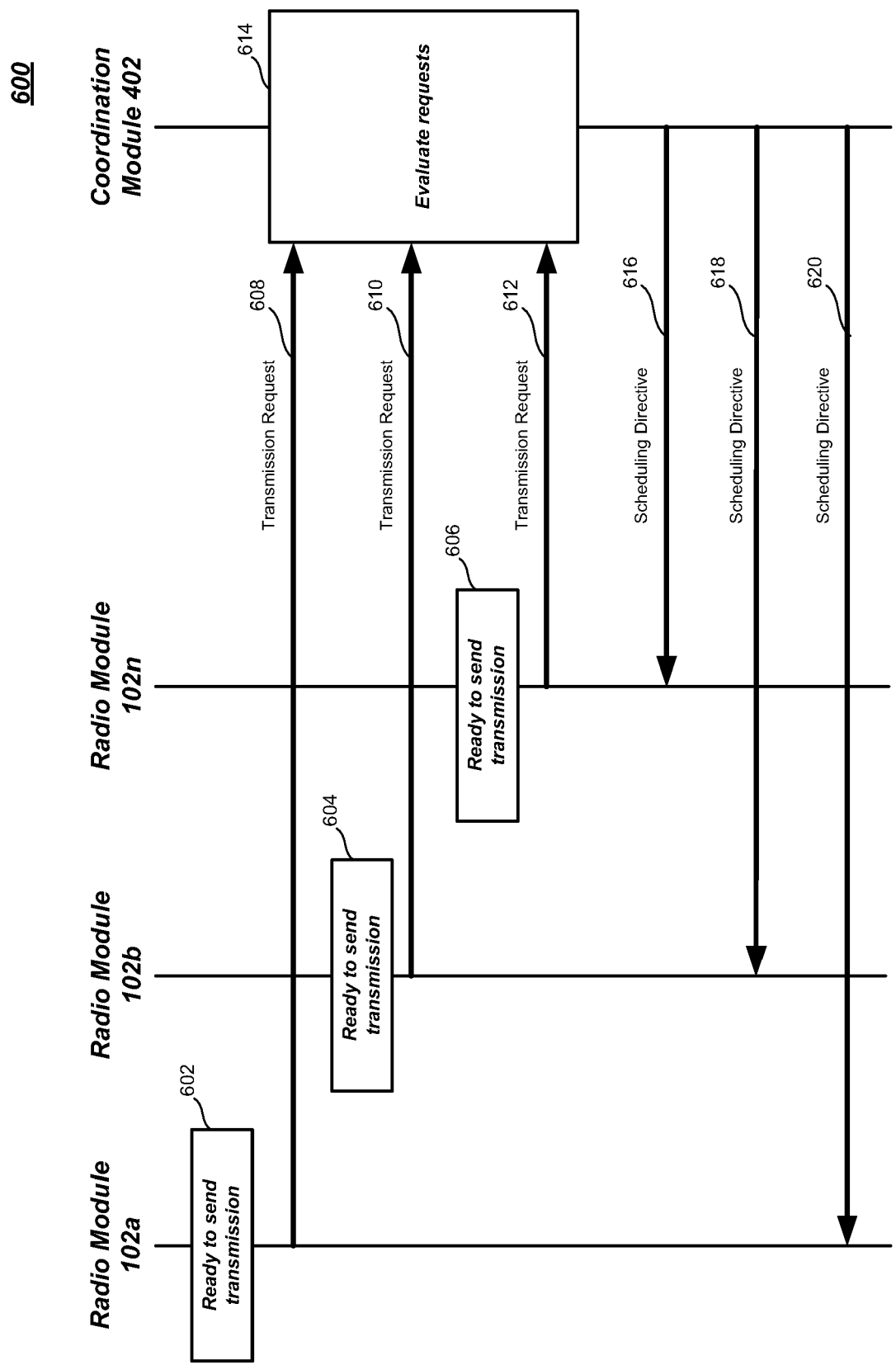
FIG. 6 is a diagram illustrating the scheduling of transmissions

Exchanges 502 may involve transmission requests and responses to such requests. FIG. 6 illustrates an example of such requests and responses. In particular, FIG. 6 is a diagram illustrating the scheduling of transmission for radio modules 102a, 102b, and 102n. This example is described with reference to apparatus 400 of FIG. 4. However, the embodiments are not limited to this context.

FIG. 6, shows blocks 602, 604, and 606, which indicate that radio modules 102a, 102b, and 102n are ready to send transmissions. As a result, radio modules 102a, 102b, and 102n send transmission requests to coordination module 402. More particularly, FIG. 6 shows radio module 102a sending a transmission request 608, radio module 102b sending a transmission request 610, and radio module 102n sending a transmission request 612.

As described herein, these requests may be sent by transmission control modules 404a, 404b, and 404n. For instance, these transmission control modules 404 may send such requests upon receipt of a ready to transmit indication from their coupled transceiver 114.

Requests 608, 610, and 612 may each include various forms of information. For example, these requests may include transmission priority indicators and/or quality of service (QOS) information. In addition, a transmission request may include a duration indicator that indicates the length of the requested transmission. Also, a request may include transmission type information (e.g., ACKNOWLEDGEMENT, TCP data, MAC data, etc.). Such information may be evaluated by coordination module in scheduling transmissions and generating scheduling directives for the requesting radio modules 102.

As indicated by a block 614, coordination module 402 evaluates transmission requests 608, 610, and 612, and determines (schedules) transmission times for each requested transmission. This evaluation and scheduling may be performed to avoid transmissions from different radio modules 102 overlapping in time. In performing such operations, coordination module 402 may access and update information in schedule data storage medium 406 to maintain a transmission schedule and find available transmission times.

Although FIG. 6 shows a single block 614 evaluating and scheduling multiple transmission requests, multiple requests may be evaluated individually or together (e.g., concurrently). In either case, transmission requests may be given precedence in accordance with any information indicated by the requests. Such information may priority or QOS indicators, transmission duration indicators, and so forth.

Upon scheduling one or more transmissions, coordination module 402 sends corresponding transmission directives to the requesting radio modules 102. For instance, FIG. 6 shows coordination module 402 sending a scheduling directive 616 to radio module 102n, a scheduling directive 618 to radio module 102b, and a scheduling directive 620 to radio module 102a. Each of these directives indicates to a radio module 102 when it may send its transmission. After receiving these transmission directives, radio modules 102a, 102b, and 102n may each send transmissions according to the scheduling information provided by these directives.

Figure 7:
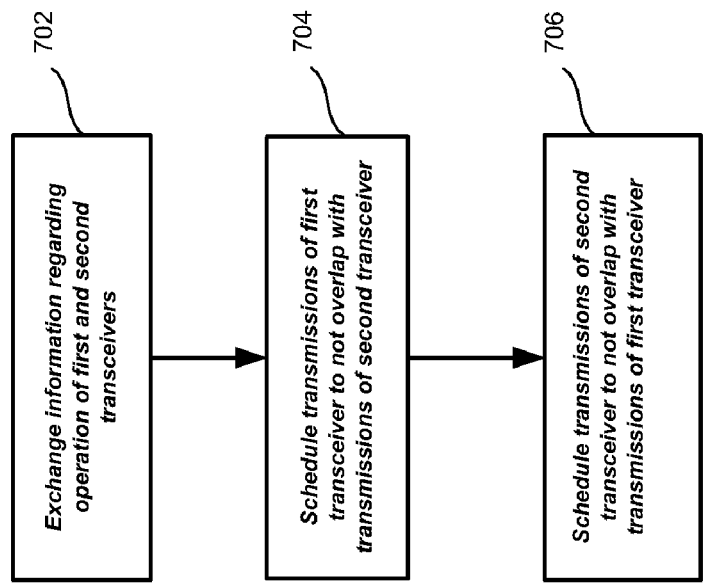
FIGS. 7 and 8 are exemplary flow diagrams

FIG. 7 illustrates an exemplary logic flow 700, which may be representative of the operations executed by one or more embodiments described herein. As shown in FIG. 7, logic flow 700 includes a block 702, which exchanges information regarding operation of co-located first and second transceivers. For example, these co-located radio modules may be within the apparatus of FIG. 1. However, the embodiments are not limited to this context. Moreover, logic flows may pertain to the exchange of such information involving any number of transceivers.

A block 704 schedules transmissions of the first transceiver based on the exchanged information. This scheduling is to avoid the transmissions of the first transceiver overlapping with transmissions of the second transceiver.

Also, a block 706 schedules transmissions of the second transceiver based on the exchanged information. This scheduling also is to avoid the transmissions of the second transceiver overlapping with transmissions of the first transceiver.

Figure 8:
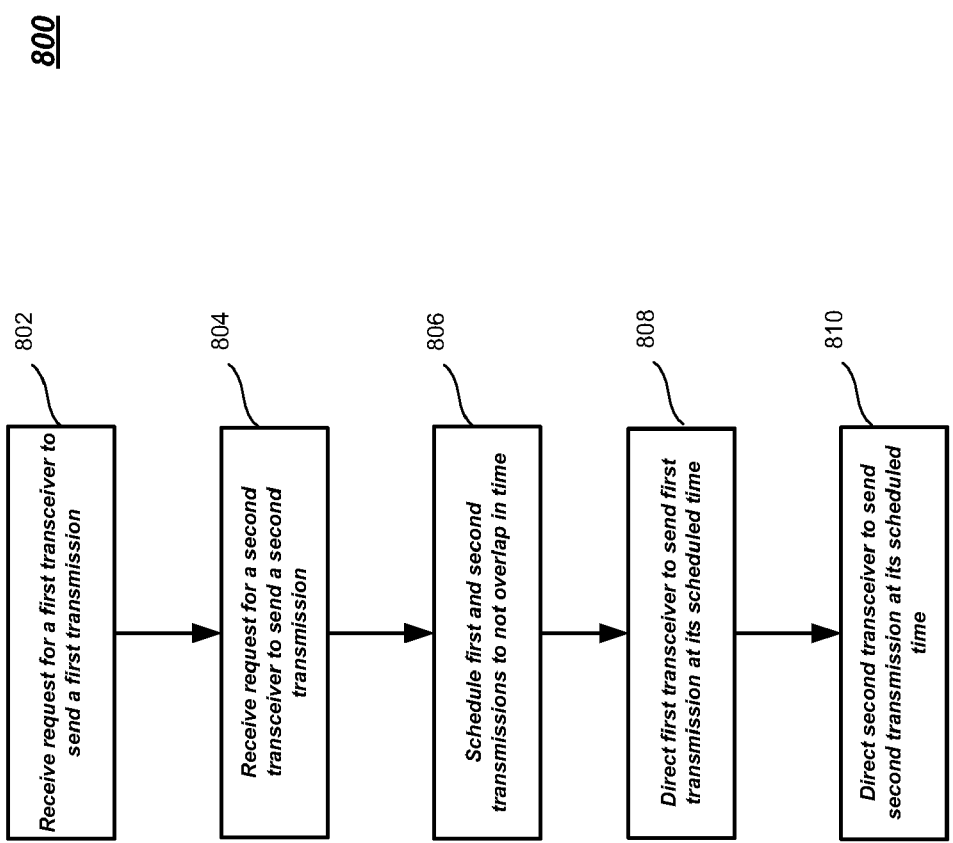

FIG. 8 illustrates an exemplary logic flow 800, which may be representative of the operations executed by one or more embodiments described herein. As shown in FIG. 8, logic flow 800 includes a block 802, which receives a request for a first transceiver to send a first wireless transmission. Also, a block 804 receives a request for a second transceiver to send a second wireless transmission. As shown in FIG. 8, a block 806 may schedule the requested wireless transmissions to not overlap in time. As described above, such scheduling for such requests may be handled individually or together. Moreover, such scheduling may give precedence to indicated priorities or QOS information.

A block 808 directs the first transceiver to send its transmission at its scheduled time. Similarly, a block 810 directs the second transceiver to send its transmission at its scheduled time. With reference to FIG. 4, blocks 802, 804, 806, 808, and 810 may be implemented by coordination module 402. However, the embodiments are not limited to such.

As described above, embodiments may provide advantages involving reduced power demands, lower spurious emissions, and interference mitigation. Such advantages are now described in greater detail.

In an apparatus with multiple co-located radios, radio modules may share a common power source (typically a battery). When a transceiver transmits wireless signals, its amplifier consumes a large amount of power from this power source. Thus, the amplifier draws a large amount of electrical current from the power source during transmission. If multiple radios happen turn on their transmit amplifiers at the same time, they may temporarily draw so much current that they exceed the capacity of the power source to deliver the required current. When that happens, the voltage output of the power source may drop below minimum requirements, or the supply current of the power source may become too low to guarantee operation of the corresponding radio module. As a result, problems may occur, such as excessive phase error, the introduction of spectral spurs, and radio module performance reduction. Thus, through avoiding simultaneous transmissions, the occurrence of such problems may be reduced.

Also, insufficient isolation may exist between multiple radio modules. In such cases, an individual transceiver amplifier may "see" a lot of unexpected power delivered to its front end. When sending transmissions, such unexpected signals may interfere with the amplifier's operation and cause undesired spurious emissions. Such spurious transmissions can degrade signal quality (often measured by Error Vector Magnitude) to an unacceptable level. Avoiding simultaneous transmissions may reduce such problems.

Moreover, simultaneous transmissions may present intended recipients of such transmissions with multiple interfering signals (e.g., interfering Bluetooth and WiFi signals). In such cases, the interfering signals may be too powerful for adequate reception of desired signal(s). Thus, avoiding overlapping transmissions may reduce the occurrence of such interference.

Figure 9:
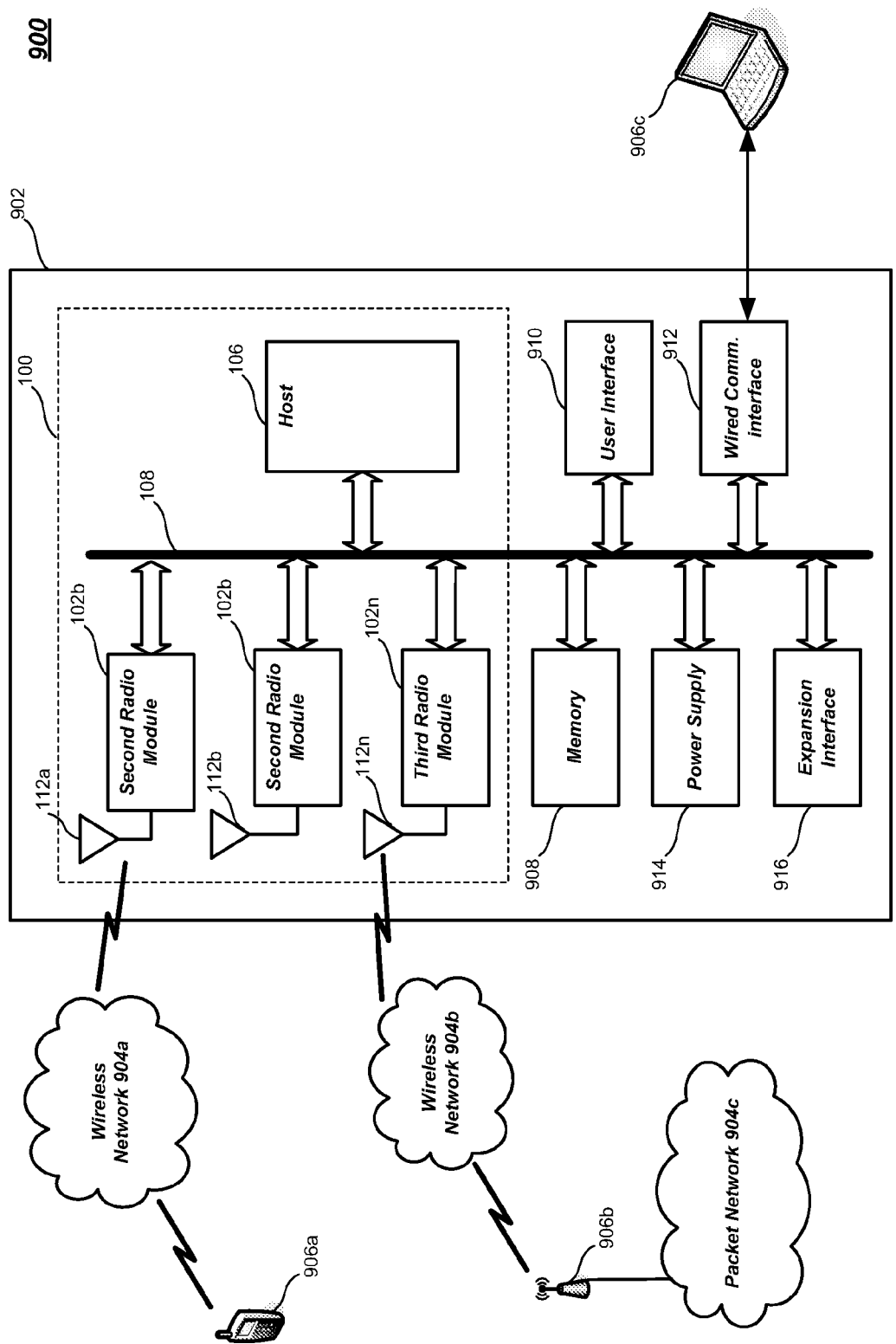
FIG. 9 illustrates an embodiment of a system.

FIG. 9 illustrates an embodiment of a system 900. This system may be suitable for use with one or more embodiments described herein, such as apparatus 100, apparatus 400, logic flows 700 and 800, and so forth. Accordingly, system 900 may engage in wireless communications across various link types, such as the ones described herein. In addition, system 900 may perform various user applications.

As shown in FIG. 9, system 900 may include a device 902, multiple communications networks 904, and one or more remote devices 906. FIG. 9 shows that device 902 may include the elements of FIG. 1. However, device 902 may alternatively include the elements of FIG. 4, as well as elements of other embodiments. As described above, such other embodiments may involve integrated host/radio architectures.

Also, device 902 may include a memory 908, a user interface 910, a wired communications interface 912, a power supply (e.g., a battery) 914, and an expansion interface 916. These elements may be implemented in hardware, software, firmware, or any combination thereof.

Power supply 914 provides operational power to elements of device 902. Accordingly, power supply 914 may include a battery. Such a battery may be rechargeable and/or removable. Alternatively or additionally, power supply 914 may include an interface to an external power source, such as an alternating current (AC) source. However, the embodiments are not limited to these examples.

Memory 908 may store information in the form of data. For instance, memory 908 may contain application documents, e-mails, sound files, and/or images in either encoded or unencoded formats. Alternatively or additionally, memory 908 may store control logic, instructions, and/or software components. These software components include instructions that can be executed by one or more processors. Such instructions may provide functionality of one or more elements. Exemplary elements include host 106, one or more components within radio modules 102a-n, coordination module 402 (e.g., of apparatus 400), user interface 910, and/or communications interface 912.

Memory 908 may be implemented using any machine-readable or computer-readable media capable of storing data, including both volatile and non-volatile memory. For example, memory 908 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 908 may be included in other elements of system 900. For instance, some or all of memory 908 may be included on a same integrated circuit or chip with elements of apparatus 100 and/or apparatus 400. Alternatively some portion or all of memory 908 may be disposed on an integrated circuit or other medium, for example a hard disk drive, which is external. The embodiments are not limited in this context.

User interface 910 facilitates user interaction with device 902. This interaction may involve the input of information from a user and/or the output of information to a user. Accordingly, user interface 910 may include one or more devices, such as a keyboard (e.g., a full QWERTY keyboard), a keypad, a touch screen, a microphone, and/or an audio speaker.

Wired communications interface 912 provides for the exchange of information with a device 906c (e.g., a proximate device), such as a personal computer. This exchange of information may be across one or more wired connections. Examples of such connections include USB interfaces, parallel interfaces, and/or serial interfaces. In addition, interface 912 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 912 may include various components, such as a transceiver and control logic to perform operations according to one or more communications protocols. In addition, communications interface 912 may include input/output (I/O) adapters, physical connectors to connect the I/O adapter with a corresponding communications medium.

FIG. 9 shows that device 902 may communicate across wireless networks 904a and 904b. In particular, FIG. 9 shows communications across network 904a being handled by radio module 102a, and communications across network 904b being handled by radio module 102n. First wireless network 904a may be a cellular network, while second wireless network 904b may be a wireless data network. However, the embodiments are not limited to these examples. Moreover, while not depicted, radio module 102b may also communicate across a wireless network.

Such wireless communications allow device 902 to communicate with various remote devices. For instance, FIG. 9 shows device 902 engaging in wireless communications (e.g., telephony or messaging) with a mobile device 906a. In addition, FIG. 9 shows device engaging in wireless communications (e.g., WLAN, WMAN, and/or PAN communications) with an access point 906b. In turn access point 906b may provide device 902 with access to further communications resources. For example, FIG. 9 shows access point 906b providing access to a packet network 904c, such as the Internet.

Expansion interface 916 may be in the form of an expansion slot, such as a secure digital (SD) slot. Accordingly, expansion interface 916 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Operations for embodiments have been described with reference to various figures and examples. Some of the figures may include a logic flow or operational sequence. Although such figures presented herein may include a particular logic flow or operational sequence, it can be appreciated that these merely provide an example of how general functionality as described herein can be implemented. Further, given logic flows and operational sequences does not necessarily have to be executed in the order presented, unless otherwise indicated. In addition, the given logic flow may be implemented by a hardware element, a software element executed by a processor, or any combination thereof. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   first and second transceivers, each to send one or more wireless transmissions;
   a first control module to schedule the wireless transmissions of the first transceiver to avoid overlapping with the wireless transmissions of the second transceiver; and
   a second control module to schedule the wireless transmissions of the second transceiver to avoid overlapping with the wireless transmissions of the first transceiver.

2. The apparatus of claim 1:
   wherein the first control module is to send to the second control module a request, the request for the first transceiver to send a first wireless transmission; and
   wherein the second control module is to send an approval of the request to the first control module upon the occurrence of at least one approval condition.

3. The apparatus of claim 2:
   wherein the request includes a priority of the first wireless transmission; and
   wherein the at least one approval condition includes the second transceiver being unprepared to send any wireless transmissions and/or the second transceiver being prepared to send a second wireless transmission, the second wireless transmission having a lower priority than the priority of the first wireless transmission.

4. The apparatus of claim 2:
   wherein the request includes a priority of the first wireless transmission; and
   wherein the at least one approval condition includes the second transceiver being unprepared to send any wireless transmissions and/or the second transceiver being prepared to send a second wireless transmission, the second wireless transmission having a priority that is less than or equal to the priority of the first wireless transmission.

5. The apparatus of claim 1:
   wherein the first control module is to send to the second control module a request for the first transceiver to send a first wireless transmission, the request including a priority of the first wireless transmission; and wherein the second control module is to send a denial of the request to the first control module when the second transceiver is prepared to send a second wireless transmission having a greater priority than the priority of the first wireless transmission.

6. The apparatus of claim 5, wherein, based on the denial of the request, the first transceiver is to refrain from sending the first wireless transmission.

7. The apparatus of claim 1:
wherein the first control module is to send to the second control module a request for the first transceiver to send a first wireless transmission, the request including a priority of the first wireless transmission; and
wherein the second control module is to send a denial of the request to the first control module when the second transceiver is prepared to send a second wireless transmission having a priority that is greater than or equal to the priority of the first wireless transmission.

8. The apparatus of claim 1:
wherein the first control module is to send a transmission indicator to the second control module, the transmission indicator to indicate that the first transceiver is sending a first wireless transmission; and
wherein, upon receipt of the transmission indicator from the first control module, the second control module directs the second transceiver to refrain from sending a second wireless transmission.

9. An apparatus, comprising:
first and second transceivers, each to send one or more wireless transmissions;
a coordination module to schedule the wireless transmissions of the first and second transceivers to avoid the wireless transmissions of the first transceiver overlapping with the wireless transmissions of the second transceiver;
a first control module to exchange information with the coordination module regarding operation of the first transceiver; and
a second control module to exchange information with the coordination module regarding operation of the second transceiver.

10. The apparatus of claim 9, wherein the coordination module is to:
receive one or more requests, each request for one of the first and second transceivers to send a wireless transmission, and
generate a schedule for the corresponding one or more wireless transmissions, the schedule preventing overlapping transmissions by the first and second transceivers.

11. The apparatus of claim 10:
wherein each of the one or more requests includes a transmission priority indicator and/or a transmission quality of service indicator; and
wherein the coordination module is to generate the schedule based on the transmission priority indicator and/or transmission quality of service indicator from each request.

12. The apparatus of claim 9, wherein each of the first and second control modules is to:
send a transmission request to the coordination module when its corresponding transceiver is ready to send a wireless transmission; and
receive from the coordination module a time for the corresponding transceiver to send the wireless transmission.

13. A method, comprising:
exchanging information between first and second control modules regarding operation of co-located first and second transceivers;
scheduling transmissions of the first transceiver based on the exchanged information to avoid the transmissions of the first transceiver overlapping with transmissions of the second transceiver; and
scheduling transmissions of the second transceiver based on the exchanged information to avoid the transmissions of the second transceiver overlapping with the transmissions of the first transceiver.

14. The method of claim 13, wherein said exchanging information between first and second control modules comprises:
sending from the first control module to the second control module, a request for the first transceiver to send a transmission; and
sending from the second control module to the first control module, an approval of the request.

15. The method of claim 14, further comprising directing the first transceiver to send a transmission.

16. The method of claim 13, wherein said exchanging information between first and second control modules comprises:
sending from the first control module to the second control module, a request for the first transceiver to send a transmission; and
sending from the second control module to the first control module, a denial of the request.

17. The method of claim 16, further comprising:
sending a further request from the first control module to the second control module, the further request for the first transceiver to send the transmission, wherein the further request is sent after a time delay following the denial.

18. A method, comprising:
receiving a first request from a first control module, the first request for a first transceiver to send a first wireless transmission;
receiving a second request from a second control module, the second request for a second transceiver to send a second wireless transmission, wherein the first and second transceivers are co-located; and
scheduling the first and second wireless transmissions to not overlap in time.

19. The method of claim 18, further comprising:
sending a first directive for the first transceiver to send the first transmission at its scheduled time; and
sending a second directive for the second transceiver to send the second transmission at its scheduled time.

20. An article comprising a machine-readable storage medium containing instructions that if executed enable a system to:
receive a first request from a first control module, the first request for a first transceiver to send a first wireless transmission;
receive a second request from a second control module, the second request for a second transceiver to send a second wireless transmission, wherein the first and second transceivers are co-located; and
schedule the first and second wireless transmissions to not overlap in time.

* * * * *